David Stuart, — Impts. in Preserving and other Vessels.

No. 4,865. Reissued April 9, 1872.

Witnesses,
Jno. B. Harding.
Harry Smith

David Stuart
by his Attys.
Howson & Son

UNITED STATES PATENT OFFICE.

DAVID STUART, OF PHILADELPHIA, PENNSYLVANIA.

IMPROVEMENT IN PROVIDING PROJECTIONS FOR KETTLES AND THE ATTACHMENTS OF BAILS.

Specification forming part of Letters Patent No. 119,666, dated October 3, 1871; reissue No. 4,865, dated April 9, 1872.

SPECIFICATION.

I, DAVID STUART, of Philadelphia, county of Philadelphia, State of Pennsylvania, have invented certain Improvements in Preserving and other Kettles, of which the following is a specification:

My invention consists of certain improvements in preserving and other kettles, too fully explained hereafter to need preliminary description, the said improvements having been designed with the view of facilitating the handling of the vessel while pouring out the contents of the same, of preventing the heating of the bail or handle, and of insuring a circulation of air beneath the kettle, under the circumstances described hereafter, so as to prevent the undue heating of the bottom of the kettle.

Figure 1:
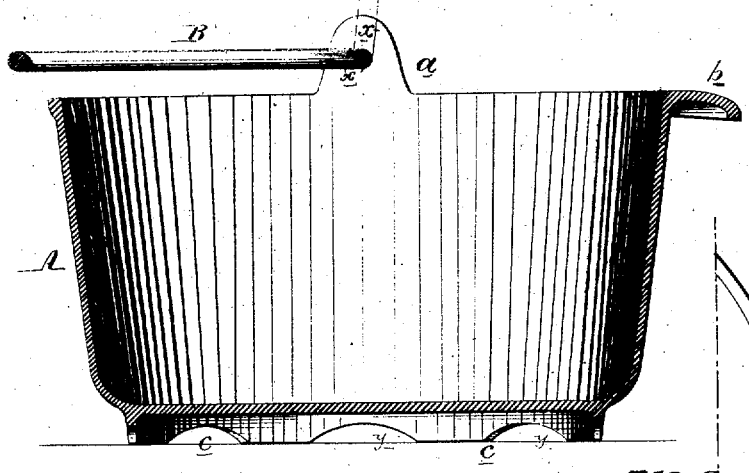
Figure 3:
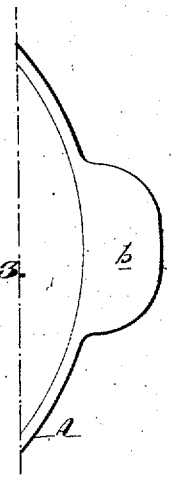
Figure 2:
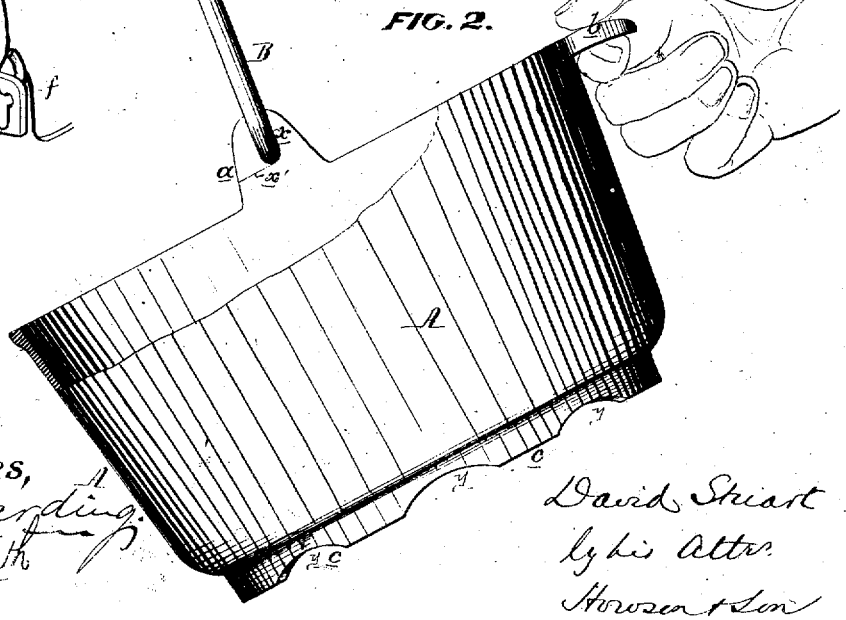

In the accompanying drawing, Figure 1 is a sectional view of a preserving-kettle with my improvements; Fig. 2, a side view, partly in section, showing the kettle as it appears when being handled in pouring out the contents; Fig. 3, a plan view of part of the top of the kettle; and Figs. 4, 5, and 6, views representing modifications of my invention.

A represents a preserving-kettle of the same general form as those in common use, and having at its upper edge, at opposite points, lugs *a a*, to which is attached a bail, B. A lip, *b*, serves as a handle by which the operator can tilt the vessel in the manner shown in Fig. 2, this lip being situated at or very near the upper edge of the vessel, for three reasons: first, it is there more free from the effects of the heat, and can, consequently, be manipulated without danger of burning the fingers; second, the lip, when situated at the upper edge of the vessel, does not interfere with the ready molding of the same, as will be readily understood by those familiar with the manufacture of vessels of this class; third, the vessels, when arranged in quantities for transportation, have to be placed one within the other, so as to be packed in as small a compass as possible. It is important, therefore, that the sides of the vessel should be free from projections which would interfere with this plan of packing, and it will be evident that the lip *b*, situated at the upper edge of the vessel, presents no impediment to the adjustment of one vessel within another. This lip *b*, combined with an ordinary bail connected to the vessel in the usual manner, affords facilities for tilting the vessel; but I prefer to restrict the movement of the bail in a manner and for a purpose which I will now proceed to explain.

The ordinary bail of a preserving-vessel can be turned freely on the lugs from one side to the other, and is permitted to rest on the upper edge of the vessel, the consequence of which is that the bail becomes too hot to be manipulated without the intervention of a cloth or other protection for the hand. This objection I overcome by forming stops or shoulders *x x'* upon the lugs *a* for limiting the movement of the bail. The stops *x* prevent the bail from being turned over onto the vessel in the direction of the lip *b*, the stops being somewhat inclined, so that, when the bail is elevated, it will be retained in a position slightly beyond the perpendicular, as shown by dotted lines in Fig. 1, the excessive heating of the bail being thus prevented when the vessel is placed on the fire. The stops *x'* prevent the bail, when depressed, from being brought into actual contact with the edge of the vessel, but retain it in a position slightly above the said edge, so that it can be readily seized by the hand and elevated. The stops *x*, independently of the utility in retaining the bail in an elevated position, in which it is maintained in a comparatively cool condition, perform the important duty of restricting the bail when the vessel is being tilted, as shown in Fig. 2, during which operation the bail is maintained at right angles, or thereabout, to the vessel, the best position for insuring the effectual tilting of the same when its contents have to be poured out.

Figure 4:
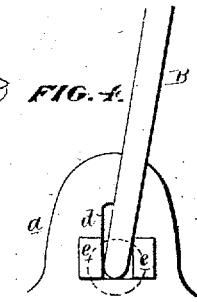
Figure 5:
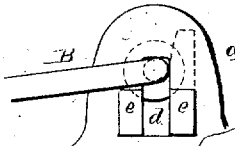

It is not essential in carrying out my invention that stops *x x'* should be employed for retaining and limiting the movement of the bail, as various equivalent devices may be used for the same purpose. In Figs. 4 and 5, for instance, the bail passes through an elongated vertical slot, *d*, in each lug *a*, and is retained in a vertical, or nearly vertical, position by projections or stops *e e* at either side of the said slot, close to the bottom of the same. When the bail is lifted it will rise to the top of the slot *d*, and can then be turned in either direction, as shown in Fig. 5; or, if desired, one of the projections may be elongated, as shown by dotted lines in the latter figure, so as to perform the same duty as the stop *x* in restricting the movement of the bail in one direction.

Figure 6:
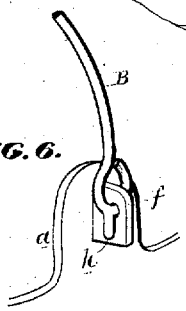

Another modification is shown in Fig. 6, where the bail passes over the lug *a*, is hung to a projection, *f*, on the outer side of the same, and has itself a projecting tongue, *h*, which strikes against the said projection *f*, thus preventing the bail from turning beyond a certain point and retaining it in an elevated position in the same manner as the stop *x*. This latter plan will permit a lid to be fitted to the vessel, which cannot be readily done when the bail is attached to the inner sides of the lugs, as in the other modifications.

Another feature of my invention is the rib *c* at the bottom of the kettle, with its recesses *y*, in place of the usual rib. This recessed rib, while it fits snugly in the boiler-hole of a stove or range in the same manner as a continuous rib, permits a free circulation of air beneath the bottom of the vessel when the latter is placed upon the hot plates of a stove, and thus prevents that undue heating of the bottom of the vessel which is apt to take place when the usual continuous rib is employed; the rib, moreover, being nearly continuous, is not so liable to be broken as are the usual isolated legs.

I claim as my invention—

1. A preserving or other kettle at or near the upper edge of which a projection, *b*, is arranged, as and for the purpose set forth.

2. A preserving or other kettle provided with a bail, which, after being raised to an upright position, is retained, substantially in the manner and for the purpose described.

3. The combination, in a preserving-vessel, of a bail restricted in its movement with a lip, *b*, for the purpose specified.

4. A kettle provided with an annular flange, *e*, in which are recesses *y*, as and for the purpose set forth.

In testimony whereof I have signed my name to this specification in the presence of two subscribing witnesses.

DAVID STUART.

Witnesses:
WM. A. STEEL,
HARRY SMITH.